United States Patent [19]

McIntyre

[11] 4,290,569
[45] Sep. 22, 1981

[54] COWLING PORT CLOSURE AND METHOD

[76] Inventor: Charles A. McIntyre, Rte. 2, Box 554, Alexandria, Ind. 46001

[21] Appl. No.: 90,336

[22] Filed: Nov. 1, 1979

[51] Int. Cl.³ ............................................. B64D 29/00
[52] U.S. Cl. ............................ 244/129.4; 60/39.09 P; 244/53 B
[58] Field of Search ................. 244/1 R, 53 B, 129.1, 244/129.4, 129.5; D12/81; 60/39.09 P; 49/463; 220/255; 137/15.1; 138/89

[56] References Cited

U.S. PATENT DOCUMENTS

| | | | |
|---|---|---|---|
| 2,609,164 | 9/1952 | Dillon | 244/1 R |
| 2,744,382 | 5/1956 | Sokol et al. | 60/39.09 P |
| 3,490,177 | 1/1970 | Perrion | 49/463 |
| 3,858,747 | 1/1975 | Wharton | 220/255 |
| 4,194,494 | 3/1980 | Wagner | 138/89 |

OTHER PUBLICATIONS

"CH-46 As Get Anti-Sand Filters", Aviation Week and Space Tech., Jul. 18, 1966, p. 83.
"Deuces Back to Back", Hot Rod, Aug. 1964 (center right photo).
Piper PA-24-260 Comanche, Jane's Pocket Book of Light Aircraft, p. 179, 1976.

Primary Examiner—Galen L. Barefoot
Attorney, Agent, or Firm—Woodard, Weikart, Emhardt & Naughton

[57] ABSTRACT

Air intake openings in an aircraft engine cowling are plugged by closures of resilient plastic material while the aircraft is parked, to exclude birds from nesting in the engine compartment. A rope is connected to the closures and draped around the propeller so that, in the event the aircraft operator fails to manually remove the closures, before the engine is started, the turning of the propeller will pull on the rope and thereby pull the closures from the openings, whereupon the closures and rope are deposited on the ground.

5 Claims, 4 Drawing Figures

COWLING PORT CLOSURE AND METHOD

BACKGROUND OF THE INVENTION

1. Field of the Invention

This invention relates generally to aircraft, and more particularly to means for excluding birds from entry and nesting in engine compartments.

2. Description of the Prior Art

Aircraft power plants for propeller-driven aircraft require some means for cooling them. Regardless of whether the power plant is a reciprocating engine of an air cooled or so-called liquid-cooled variety, there is usually some front-facing opening to admit air for cooling. Where the engine is of the direct air-cooled variety, such openings are generally at the front of the engine cowling. Where the engine has a horizontally opposed cylinder arrangement, there are usually two such openings located on diametrically opposite sides of the propeller shaft.

Where an aircraft is stored outdoors, or in shelters, barns, or hangers, unless birds are excluded, there is a reasonable likelihood of entry of birds through such air intake openings for nesting in the opening or somewhere else in the engine compartment. This is particularly true where an aircraft is left un-attended for a period of several days. Some birds which nest in such locations are comparatively small birds, and their nests may be un-detected. Even if detected, the nest may be difficult to remove and, in any event, it is inconvenient.

If it happens that an aircraft is operated with bird nests in air intake openings, it is likely to be at least detrimental, if not always absolutely hazardous. In addition to interference with proper cooling of the engine, the possible deterioration of the nest during flight may result in other problems, such as fouling of engine controls and contamination of the fuel-air mixing system. This may be even more detrimental than an overheated engine.

I believe that there is available in the industry, some screening means to exclude birds from entry through air intake ports. The difficultly with screening means is the interference with air flow which necessarily results from intake screens themselves, plus the potential for further deteriorating airflow when the screens themselves become obstructed by insects and other debris. Therefore, I do not believe that screening is a satisfactory solution to the problem. Although the aircraft operator should check exposed ports for birds nests, as part of a pre-flight routine, many operators do not do so and, even if they do, there remains the possibility that a nest will not be discovered, plus the inconvenience of removal of a nest, once discovered. The present invention is directed to solving this problem.

SUMMARY OF THE INVENTION

Described briefly, according to a typical embodiment of the present invention, temporary closure means are installed in air intake openings of an engine cowling. A flexible line connected to the closure means is draped over the propeller so that, it the closure means are not manually removed before "cranking" the engine for starting, the closure means will be pulled from the openings, and deposited on the ground along with the line, during the engine cranking.

DESCRIPTION OF THE PREFERRED EMBODIMENT

Figure 1:
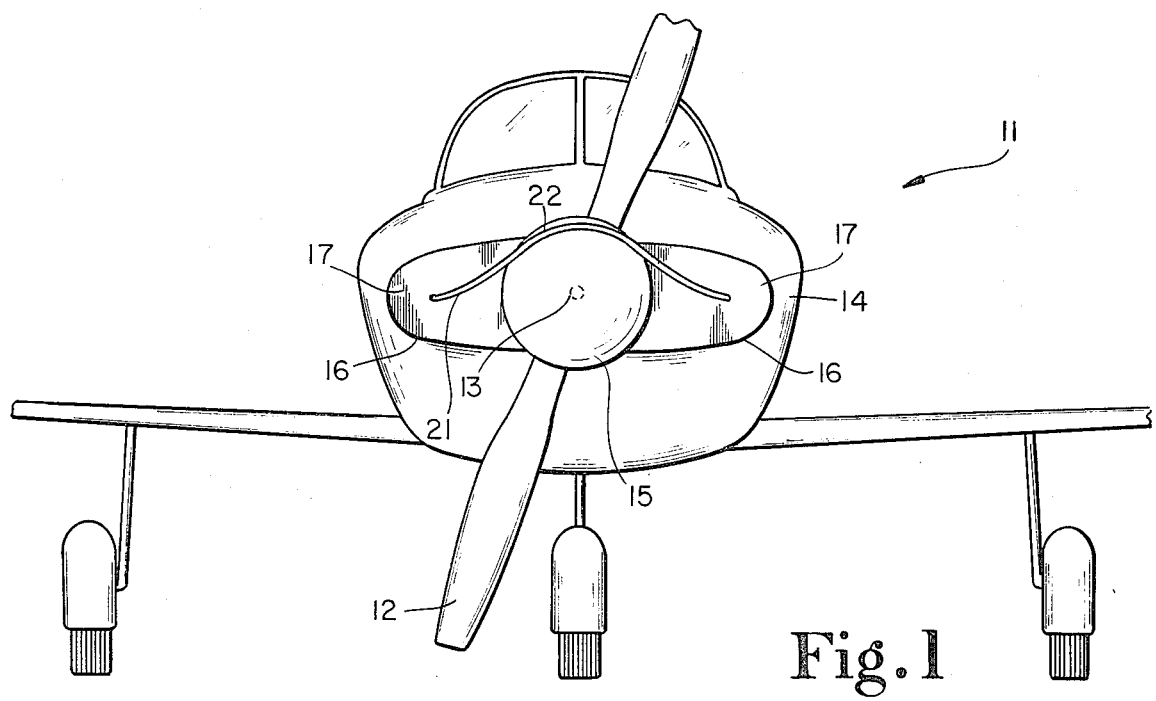
FIG. 1 is a front elevational view of an aircraft with apparatus installed thereon according to the present invention.

Referring now to the drawings in detail, and more particularly to FIG. 1, there is shown an airplane 11 having a propeller 12 at the front end of a shaft 13 driven by a horizontally opposed air-cooled engine inside the cowling 14. There are two frontal openings 16 on diametrically opposite sides of the propeller shaft 13 and which normally expose the two banks of cylinders to cooling air as the aircraft propeller rotates, and to additional air flow as the aircraft moves forward. It is these and similar openings in aircraft engine cowling which are used for access by birds to nesting areas in the engine compartment.

Figure 2:
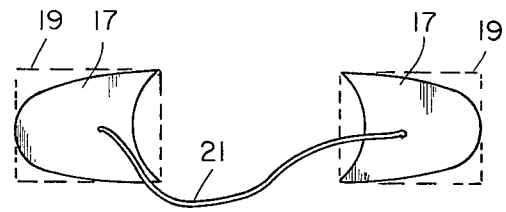
FIG. 2 is an elevational view of the apparatus of the present invention according to one embodiment thereof, uninstalled.
Figure 4:
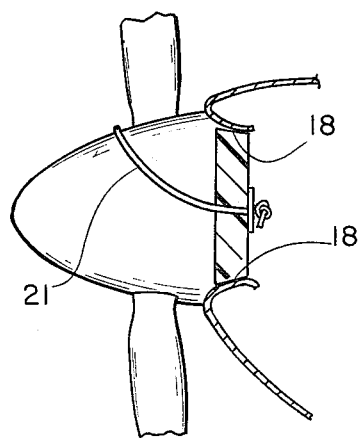
FIG. 4 is a section through a portion of an engine cowling, showing a closure member installed therein.

According to a typical embodiment of the present invention, where the engine to be protected has two openings situated as illustrated, resilient closure members 17 are installed in the openings and snugly engaged against the perimeter of each opening as shown at 18 in FIG. 4. These closures are preferably of material sufficiently deformable (at least around the closure perimeter) to be insertable in the openings and resiliently conform to irregularities in the openings, and remain in place until intentionally removed. They should also be of a material which can be readily cut from a blank such as indicated by the dotted outline 19 in FIG. 2, which would be a rectangular blank of material from which the closures can be cut, as by scissors, to fit the opening of the particular aircraft involved. Polyurethane foam materials are suitable for this purpose, as would be natural sponge or plastic sponge or other materials having the above mentioned characteristics. In addition to the pliability and resilience and easy cutting features, it would be preferable for the material to have a flame inhibiting and combustion retardant characteristic.

Figure 3:
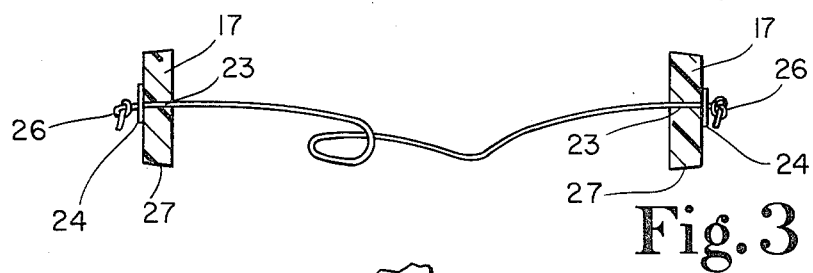
FIG. 3 is a section through each of two closure members of FIG. 2, illustrating the typical connection of the rope to the closure members.

A flexible line 21 extends from the approximate center of each of the closures to that of the other, and is draped over the propeller hub spinner 15 at 22. The line 21 may be a plastic rope passing through apertures 23 in the centers of the closures, and through the aperture of each of two washers 24, and knotted at the washers as at 26. In the typical installation for the aircraft illustrated, the rope may be approximately one foot long, and the washers 24 of adequate diameter and rigidity to assure that the knot will not pull through the closure but will, instead, pull the closure or plug 17 from the opening 16 in the event the propeller begins to turn. It is preferable that the perimeter of the washer be clear of the opening 16 by about three inches in all directions. In this way, there is assurance that if the propeller pulls the closures from the openings, there will be no tearing or other damage to the cowling by interference of the washer with it. Also, as is best shown in FIG. 3, the edge 27 of the closure can be tapered in an inboard direction. That is to provide a closure perimeter smaller on the knot relating side of the closure adjacent the knot if desired, than on the opposite face, to facilitate closure installation. Such taper should not normally be needed when the closure is of a sufficiently resilient flexible material. An example of a material suitable for the rope is the braided nylon or polypropylene rope widely used for water skiing tow rope. It is preferable that the rope material be a flame inhibiting or combustion retardant material.

It should be understood that it is desirable that the closures of the present invention be removed manually from the openings prior to starting the aircraft engine. Nevertheless, in the event this step is overlooked, the draping of the rope around the propeller in the manner shown will cause the turning of the propeller to remove both closures from the opening without damage to anything, and deposit of the whole assembly of rope and closures on the ground immediately in front of the aircraft. The rope length being less than that of the propeller, precludes any possibility of wrapping around the shaft or hub, so that the assembly will normally be deposited on the ground upon a half turn of the propeller as soon as the draped portion is down. Even in the worst case, it will be thrown from the propeller by centrifugal force if it happens to remain on the propeller until the engine starts. In this connection, it should be remembered that a propeller blade will normally make several complete turns at a very slow speed as the engine is "cranked" by an electric, pneumatic or hydraulic starter, before the engine starts and before the rotational speed is sufficient enough to develop a centrifugal force of any significance. Therefore, the assembly will likely drop to the ground during the second half turn, if it does not do so during the first half turn.

From the foregoing description, it will be seen that, although the present invention involves a very simple apparatus, it performs a very useful function but has built-in safety features. It is adaptable to various sizes and shapes of engine intake openings, and can be used on those aircraft where there is but a single air intake opening below the propeller shaft.

While the invention has been illustrated and described in detail in the drawings and foregoing description, the same is to be considered as illustrative and not restrictive in character, it being understood that only the preferred embodiment has been shown and described, and that all changes and modifications that come within the spirit of the invention are desired to be protected.

I claim:

1. Cowling port closure apparatus comprising:
   a first closure member having an edge portion adapted to fit a cowling opening, said edge portion being resilient;
   a flexible line extending from said closure member and engaged with said closure member for limited translational movement with respect to said closure member in one direction whereby, upon pulling that portion of said line remote from the closure member, the closure member will be moved by the line in the direction of the pull,
   said closure member being a uniform homogeneous piece of polyurethane foam material having dimensions relatively large along two axes by comparison with the third axis, the third axis dimension being the thickness thereof,
   said closure member having a generally centrally located aperture therein receiving a portion of said line therethrough;
   a comparatively rigid washer around the portion of said line adjacent said closure member at one face of said closure member, and having an aperture therethrough larger than the line but smaller than a knot at the end of said line immediately adjacent such face;
   the edge of said closure member being tapered in a direction such that the face thereof adjacent the washer is larger than the face thereof remote from the washer;
   a second closure member at an opposite end of said line and substantially identical to said first closure member; and
   a washer adjacent a central aperture in said second closure member and having a central aperture receiving the opposite end of said line therethrough and smaller than a knot at said opposite end of said line.

2. The apparatus of claim 1 wherein:
   the line has a fully extended length of from one to two feet between the knots thereon.

3. Apparatus for excluding birds from air intake openings of engine compartments comprising:
   an aircraft engine housing portion having a pair of openings therein for air intake;
   a central opening in said housing portion between said intake openings for a propeller shaft;
   a propeller shaft extending through said central opening and having a propeller thereon;
   a closure member in each of said openings;
   a flexible line extending from each of said closure members around said propeller and to the other of said closure members; and
   means on said line at said closure members to transmit a force from said line to said closure members for removal of said closure members from said openings upon application of tensile force to said line outside the engine housing portion;
   said line being draped over the propeller hub in front of the propeller, and
   said line extending forward from one of said closure members behind the plane of rotation of the propeller at one side of the propeller shaft axis, and around the front of the propeller above the shaft axis, and back to another of said closure members behind said plane and at the opposite side of said axis, said line being short enough to prevent it from falling down over the front of the hub while both closure members are in said openings.

4. The apparatus of claim 3 wherein:
   said closure members are made of a flexible resilient material, and said line is a rope.

5. The apparatus of claim 4 wherein:
   said resilient material is sponge-like.

* * * * *